Aug. 11, 1925. 1,549,188
R. J. COOKE
FOOD CONTAINER AND HEATER
Filed Aug. 28, 1923   3 Sheets-Sheet 1

Inventor
R. J. Cooke
By C. A. Snow & Co.
Attorneys.

Patented Aug. 11, 1925.

1,549,188

UNITED STATES PATENT OFFICE.

ROBERT J. COOKE, OF OZONA, TEXAS.

FOOD CONTAINER AND HEATER.

Application filed August 28, 1923. Serial No. 659,826.

*To all whom it may concern:*

Be it known that I, ROBERT J. COOKE, a citizen of the United States, residing at Ozona, in the county of Crockett and State of Texas, have invented a new and useful Food Container and Heater, of which the following is a specification.

This invention relates to an apparatus of the steam table type for keeping food warm after it has been cooked.

The object of the invention is to provide a simply constructed apparatus of this character especially designed for use at barbecues and which is so constructed that large quantities of cooked food may be kept warm for an indefinite period at a minimum expense and without the food drying up.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
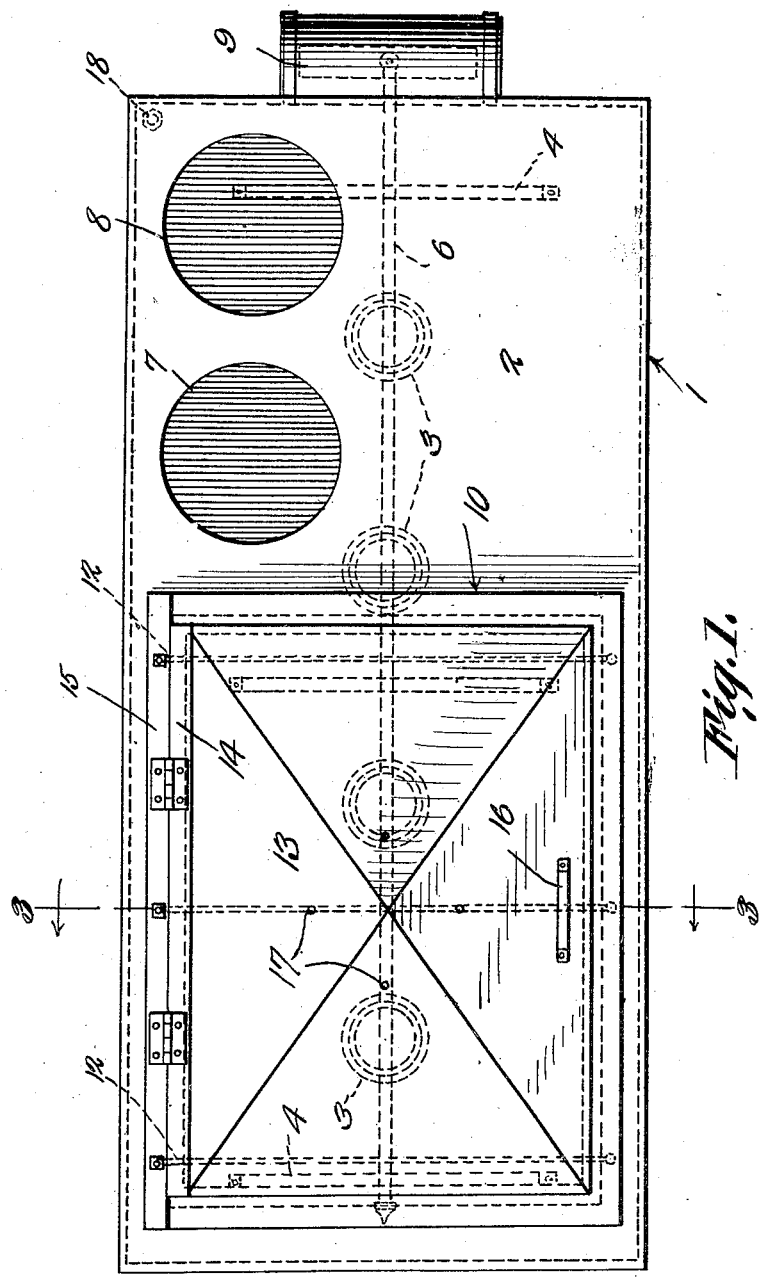
Figure 1 represents a top plan view of an apparatus constructed in accordance with this invention.

In the embodiment illustrated a hot water tank 1 is shown constructed of galvanized metal of any suitable or desired size and which is equipped with a top 2 having overhanging flanges. Arranged under the bottom 5 of the tank is a plurality of burners 3 any desired number of which may be employed four being here shown and which are mounted in depending hangers 4 carried by the tank bottom 5. A feed pipe 6 connects these burners and leads from a supply tank 9 mounted on one end of the tank.

The top 2 is equipped with a plurality of openings 7 and 8 designed to receive crocks, jars or other containers in which foods may be placed and kept warm.

Figure 2:
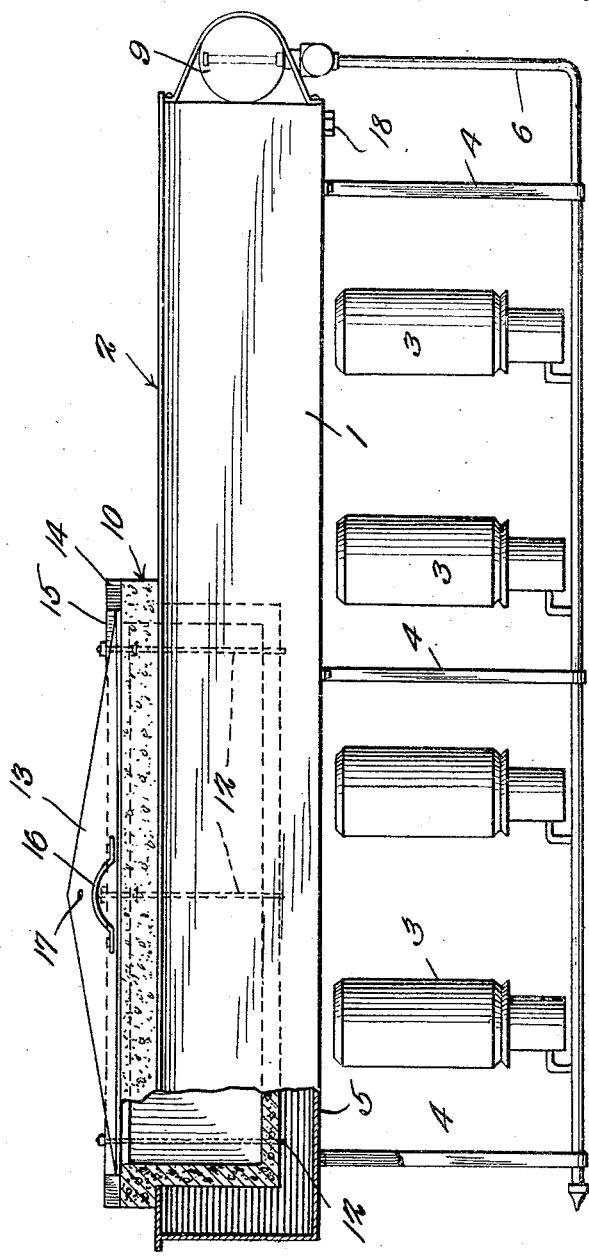
Fig. 2 is a side elevation thereof with parts broken out and in section.
Figure 3:
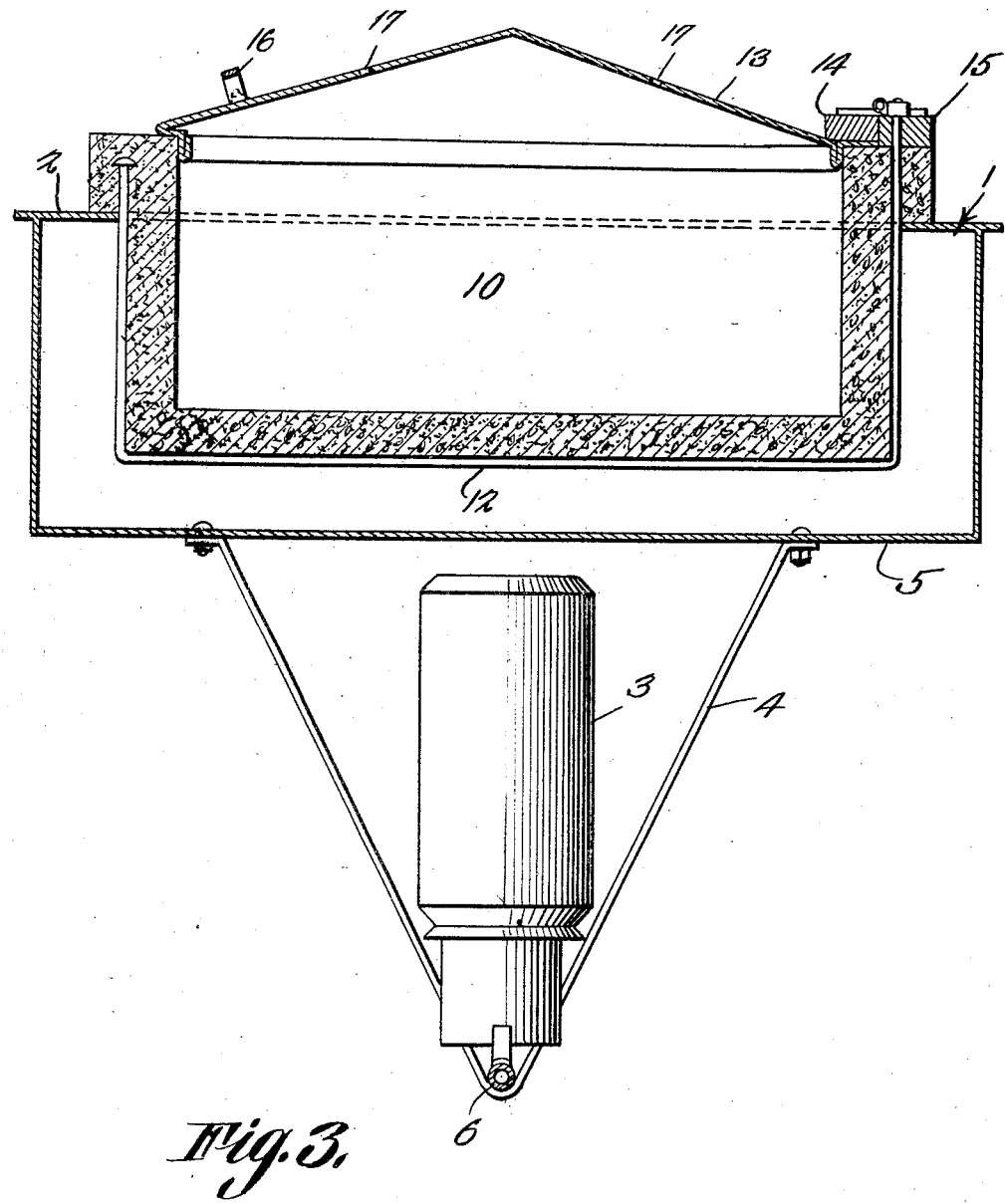
Fig. 3 is a transverse section taken on the line 3—3 of Fig. 1.

A large food container 10 constructed of concrete, crockery or any other suitable material is mounted in an opening in the top 2 of tank 1 having laterally extending flanges around its upper portion which rest on the top around the opening therein as is shown clearly in Figs. 2 and 3. This container is reinforced by a plurality of U bolts or rods 12 three being here shown and which connect to the upper face of the flange of the box a wooden strip or cleat 15 to form a support for a hinged strip 14 which carries the top 13 of the box. This top 13 is preferably constructed of copper and is made dome-shaped to provide for draining of condensed moisture back into the box. This top or lid 13 is equipped with a two inch flange which extends over the upper face of the box and down into the box as is shown clearly in Fig. 3.

A handle 16 is provided to facilitate opening and closing of the box lid and said lid has a plurality of vent openings 17.

A drain plug 18 is located in the bottom 5 of the tank for removing the water therefrom when desired.

This apparatus may be mounted on any suitable support, not shown, and the box or container 10 being made of crockery, concrete or the like will after it is heated retain a uniform temperature and keep food placed therein warm and moist for a long time.

It is of course understood that the food is first cooked in any suitable manner and then placed in the container 10 where it is retained until desired for use.

Various changes in the form, shape, proportion and other minor details of construction may be made without departing from the principle or sacrificing any of the advantages of the claimed invention.

I claim:—

In an apparatus of the class described, a hot water tank having a closed top with an opening therein, a thick-walled food container inserted in said opening and composed of heat retaining material and equipped with a flange overlying the top of the tank, U-shaped reinforces extending around said container, a wooden strip secured to the upper face of said container by said reinforces, another strip hinged to said first mentioned strip and carrying a closure for said container.

In testimony that I claim the foregoing as my own, I have hereto affixed my signature in the presence of two witnesses.

ROBERT J. COOKE.

Witnesses:
A. E. DELAND,
W. H. AUGUSTINE.